(12) United States Patent
Klimke et al.

(10) Patent No.: US 10,229,352 B2
(45) Date of Patent: Mar. 12, 2019

(54) CHIP ARRANGEMENT AND METHOD FOR CHECKING WHETHER A CHIP IS ARRANGED IN AN INTENDED CHIP CARRIER

(71) Applicant: Infineon Technologies AG, Neubiberg (DE)

(72) Inventors: Martin Klimke, Munich (DE); Berndt Gammel, Markt-Schwaben (DE); Frank Pueschner, Kelheim (DE); Peter Stampka, Burglengenfeld (DE)

(73) Assignee: Infineon Technologies AG, Neubiberg (DE)

( * ) Notice: Subject to any disclaimer, the term of this patent is extended or adjusted under 35 U.S.C. 154(b) by 57 days.

(21) Appl. No.: 14/549,578

(22) Filed: Nov. 21, 2014

(65) Prior Publication Data

US 2015/0144697 A1 May 28, 2015

(30) Foreign Application Priority Data

Nov. 22, 2013 (DE) .................. 10 2013 112 931

(51) Int. Cl.
*G06K 19/06* (2006.01)
*H01L 29/18* (2006.01)
*H01L 33/00* (2010.01)
*G06K 19/073* (2006.01)
*G06K 19/077* (2006.01)

(52) U.S. Cl.
CPC . *G06K 19/07381* (2013.01); *G06K 19/06009* (2013.01); *G06K 19/077* (2013.01)

(58) Field of Classification Search
CPC ........... G06K 19/07381; G06K 19/077; G06K 19/06009; B41J 2002/061; B41J 2/065; Y10S 101/37
USPC ............................................ 257/88
See application file for complete search history.

(56) References Cited

U.S. PATENT DOCUMENTS

| 7,005,733 | B2 | 2/2006 | Kömmerling et al. | |
|---|---|---|---|---|
| 2004/0159708 | A1* | 8/2004 | Yogev | G06K 7/10009 235/492 |
| 2009/0100265 | A1* | 4/2009 | Tadokoro | G07C 9/00087 713/172 |
| 2010/0078636 | A1 | 4/2010 | Zachariasse | |
| 2010/0118131 | A1* | 5/2010 | Lee | G06K 9/00013 348/77 |

(Continued)

FOREIGN PATENT DOCUMENTS

DE 603 19 051 T2 2/2009
DE 10 2007 051 788 A1 5/2009

(Continued)

*Primary Examiner* — Duy T Nguyen
(74) *Attorney, Agent, or Firm* — Viering, Jentschura & Partner mbB (57) ABSTRACT

One embodiment describes a chip arrangement having a chip carrier; a chip which is arranged in or on the chip carrier; a light sensor arrangement; a transparent layer which covers the light sensor arrangement, the light sensor arrangement being set up to determine a light pattern of light received by the light sensor arrangement from outside the chip arrangement through the transparent layer; and a test circuit which is set up to check whether the light pattern matches a reference light pattern and to output a signal on the basis of the result of the check.

14 Claims, 5 Drawing Sheets

(56) References Cited

U.S. PATENT DOCUMENTS

| | | | |
|---|---|---|---|
| 2010/0316251 A1* | 12/2010 | Cowburn | G03G 21/046 382/100 |
| 2012/0024708 A1* | 2/2012 | Chiou | B01L 3/502792 204/643 |
| 2012/0038463 A1 | 2/2012 | Kaminska et al. | |

FOREIGN PATENT DOCUMENTS

| | | |
|---|---|---|
| EP | 1429227 A2 | 6/2004 |
| EP | 1429227 B1 | 2/2008 |
| EP | 2313852 B1 | 2/2012 |
| EP | 1891582 B1 | 10/2012 |
| WO | 2009016589 A2 | 2/2009 |

* cited by examiner

CHIP ARRANGEMENT AND METHOD FOR CHECKING WHETHER A CHIP IS ARRANGED IN AN INTENDED CHIP CARRIER

CROSS-REFERENCE TO RELATED APPLICATION

This application claims priority to German Patent Application Serial No. 10 2013 112 931.5, which was filed Nov. 22, 2013, and is incorporated herein by reference in its entirety.

TECHNICAL FIELD

Various embodiments relate generally to chip arrangements and methods for checking whether a chip is arranged in an intended chip carrier.

BACKGROUND

Identification chips (ID chips) are typically used in electronic identification documents in order to increase the counterfeit protection for these documents and in order to keep the time for detecting machine-testable electrical and optical security features low, for example at border crossings, for example to limit the time to approximately five seconds.

An ID chip is typically bonded to the identification document by mechanically embedding the ID chip in carrier material of the identification document. In addition, the information stored in the ID chip can be compared with the information visible in or on the document in the form of imprints in order to ensure that the document contains the correct ID chip.

However, it is fundamentally possible to separate an ID chip from the carrier material of a document and insert it into a counterfeit document having (counterfeit) optical features (for example image and identification number) for which corresponding information could be stored in the ID chip and thus to produce a fully functional machine-testable counterfeit electronic identification document.

SUMMARY

Various embodiments provide a chip arrangement having a chip carrier; a chip which is arranged in or on the chip carrier; a light sensor arrangement; a transparent layer which covers the light sensor arrangement, the light sensor arrangement being set up to determine a light pattern of light received by the light sensor arrangement from outside the chip arrangement through the transparent layer; and a test circuit which is set up to check whether the light pattern matches a reference light pattern and to output a signal on the basis of the result of the check.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In various embodiments, a chip arrangement having improved bonding between the chip and the chip carrier (for example ID chip and carrier material of an identification document) is provided.

As described below, one embodiment provides a chip arrangement having improved bonding of a chip to the chip carrier (for example an ID chip to the carrier material of an identification document). According to one embodiment, this bonding can be electronically tested in a quick and cost-effective manner and can be individually created once for each document in order to prevent the ability to replace chips and therefore to prevent production of counterfeit electronic documents, for example.

Figure 1:
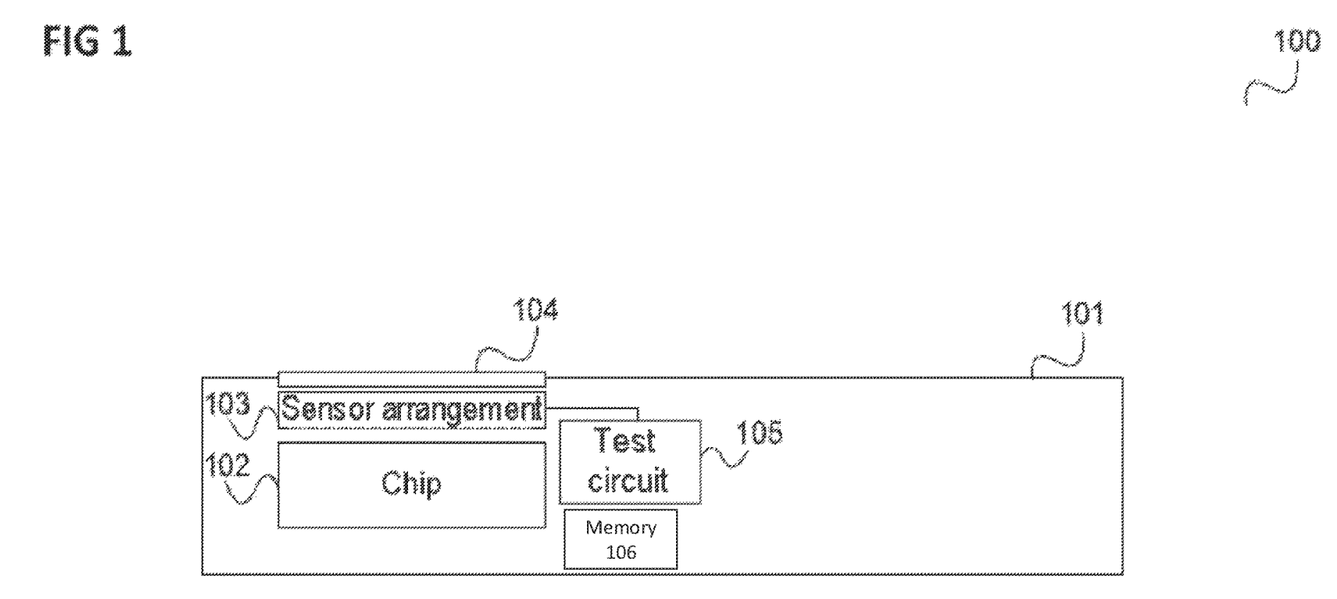
FIG. 1 shows a chip arrangement according to one embodiment.

FIG. 1 shows a chip arrangement 100 according to one embodiment.

The chip arrangement 100 has a chip carrier 101, a chip 102 which is arranged in or on the chip carrier 101 and a light sensor arrangement 103.

The chip arrangement 100 also has a transparent layer 104 which covers the light sensor arrangement, the light sensor arrangement 103 being set up to determine a light pattern of light received by the light sensor arrangement 103 from outside the chip arrangement 100 through the transparent layer 104.

The chip arrangement 100 also has a test circuit 105 which is set up to check whether the light pattern matches a reference light pattern and to output a signal on the basis of the result of the check.

In other words, one embodiment provides a chip arrangement which is set up to check (for example periodically or when starting a particular function, for example of the chip, or in response to a request from an external device, for example a reader for the chip arrangement) whether the light pattern, which results during irradiation of a transparent covering layer, matches a predefined reference light pattern. A lack of a match may be handled as an indication that the chip has been removed from its original chip card carrier.

In other words, one embodiment provides a test system in which a check is carried out in order to determine whether optical security features of a chip arrangement, for example of an electronic identification document, match optical security features stored in the chip arrangement, for example in an identification chip.

One embodiment therefore achieves improved bonding between the chip and the chip carrier by virtue of optical features in the surrounding material (that is to say in the surrounding carrier material) of the chip, which optical features can be detected by a light sensor arrangement, for example by photodiodes, for example by means of additional illumination at the location of the check. The result of the check by the test circuit (which is implemented by the chip itself, for example) can be transmitted to a checking system via an electrical interface (contactless or with contacts).

The light sensor arrangement may be arranged on the chip or integrated in the latter, or else may be arranged beside the chip.

The signal indicates, for example, whether the light pattern matches the reference light pattern.

According to one embodiment, the chip arrangement is a chip card and the chip carrier is a chip card body.

According to one embodiment, the chip arrangement is an identification document, the chip is an identification chip and the chip carrier is a carrier material of the identification document.

The light sensor arrangement is arranged on the chip, for example.

The chip may include the light sensor arrangement.

The chip may include the test circuit.

The transparent layer is a film, for example.

The transparent layer includes an optical pattern, for example.

The transparent layer includes an optical pattern consisting of transparent and opaque elements, for example.

According to one embodiment, the optical pattern includes elements which are opaque or transparent depending on the frequency of visible light.

The transparent layer is part of the chip carrier, for example.

According to one embodiment, the test circuit is set up to output the signal to a checking apparatus which is outside the chip arrangement.

According to one embodiment, the chip arrangement has a memory for storing information relating to the reference light pattern and the test circuit is set up to check whether the light pattern matches the reference light pattern on the basis of the information relating to the reference light pattern.

The information relating to the reference light pattern is a hash value of the reference light pattern (for example a hash value of a representation of the reference light pattern as a binary value), for example.

The light sensor arrangement has a plurality of light sensors (for example photodiodes), for example.

Figure 2:
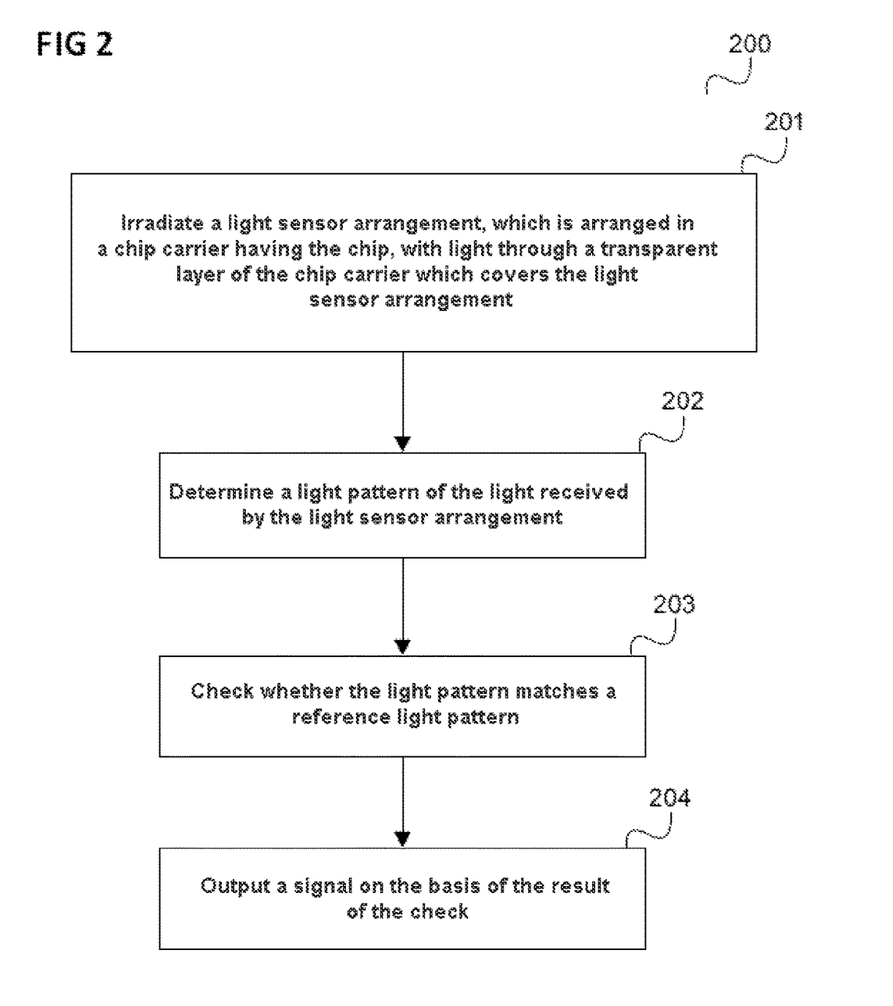
FIG. 2 shows a flowchart illustrating a method for checking whether a chip is arranged in an intended chip carrier according to one embodiment.

One embodiment provides a method, as illustrated in FIG. 2.

FIG. 2 shows a flowchart 200 according to one embodiment.

The flowchart 200 illustrates a method for checking whether a chip is arranged in an intended chip carrier.

In 201, a light sensor arrangement, which is arranged in a chip carrier having the chip, is irradiated with light through a transparent layer of the chip carrier which covers the light sensor arrangement.

In 202, a light pattern of the light which is received by the light sensor arrangement (that is to say which impinges on the light sensor arrangement) is determined.

In 203, a check is carried out in order to determine whether the light pattern matches a reference light pattern.

In 204, a signal is output on the basis of the result of the check.

The light sensor arrangement is irradiated with light from a light source outside the chip arrangement, for example.

The method also includes, for example, checking whether the chip is arranged in an intended chip carrier on the basis of the signal.

Embodiments which are described in connection with the chip arrangement 100 analogously apply to the method illustrated in FIG. 2 and vice versa.

Embodiments are explained in more detail below.

Figure 3:
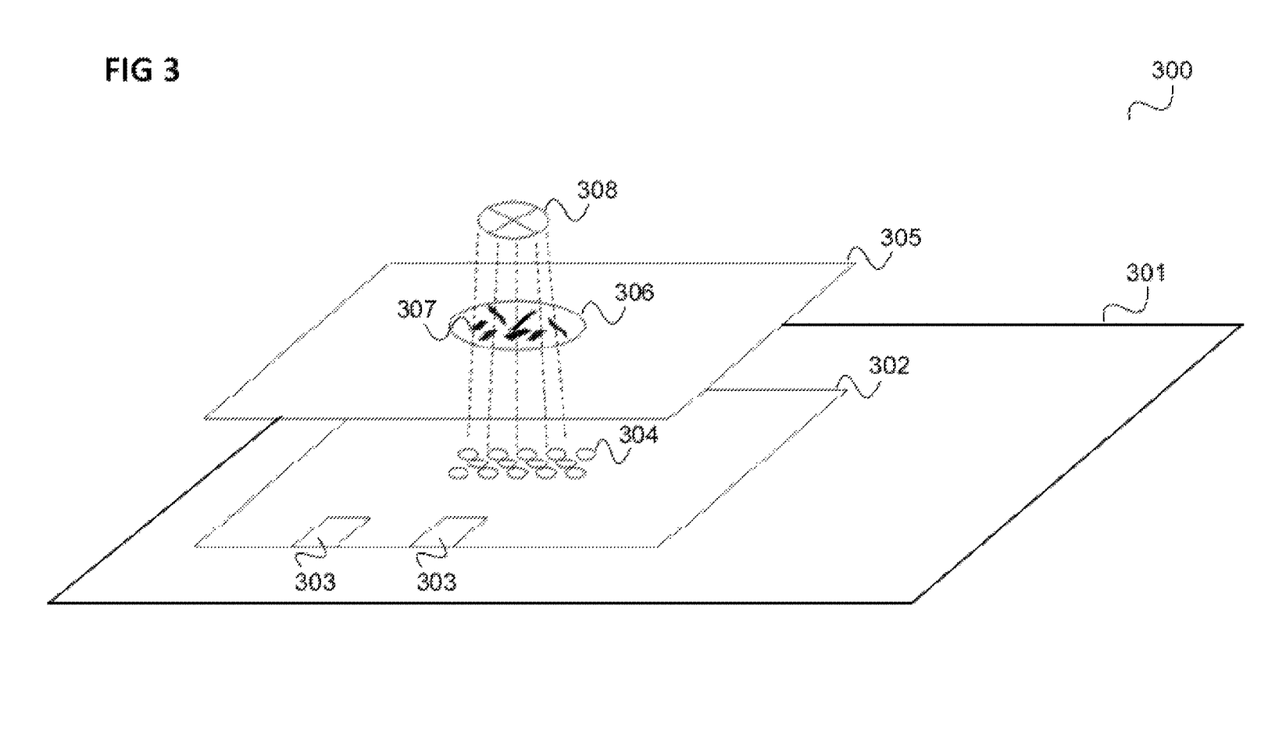
FIG. 3 shows a chip arrangement according to one embodiment.

FIG. 3 shows a chip arrangement 300 according to one embodiment.

The chip arrangement 300 has a chip carrier 301 and a chip 302.

For example, the chip 302 is an ID chip which is embedded in a surrounding material of an identification document (for example an ID, a passport or a driving license).

The chip has contacts 303 for connecting an antenna (which may be arranged in the chip carrier 301) or for making mechanical contact, for example using the contacts (for example contact needles or contact springs) of a reader.

The chip 302 also has a light sensor arrangement having a plurality of light sensors 304 (for example light-sensitive photodiodes) which are integrated, e.g. monolithicall integrated, on the chip, for example. The chip is covered using a covering layer (for example a film or printed layer) 305 which is part of the chip carrier 301 (illustrated here at a great distance from the chip as an exploded drawing). The covering layer 305 has a transparent window 306 which is arranged above the light sensors 304. Inside the transparent window 306, the covering layer 305 has an engraved optical pattern 307. The optical pattern 307 is used as the optical signature of the covering layer and therefore of the surrounding material of the chip 302 and of the chip carrier 301.

The transparent window 306 and the engraved pattern 307 of the covering layer are geometrically placed above the light sensor arrangement, that is to say the array of light sensors 304, in such a manner that light from a light source 308 outside the chip arrangement 301 reaches the light sensors through the window 306 and images the optical pattern 307 onto the light sensors as a light pattern.

With the aid of the light sensor arrangement 304 and corresponding illumination by the light source 304, the chip 302 can therefore determine the individual optical signature of the surrounding material and can check whether the optical signature matches a reference signature by checking whether the light pattern generated by the optical signature matches the light pattern generated by the reference signature.

The optical pattern 307, that is to say the signature of the surrounding material of the chip 302, is produced, for example, by individually printing the chip carrier (in the region of the covering layer 305) as part of the personalization of the chip arrangement (for example the identification document) or by introducing a special layer into the surrounding material (that is to say the chip carrier 301), which has a variable individual optical signature.

In the case of an identification document, the ID chip is paired with the signature of the surrounding material, for example in the step of personalizing the identification document, that is to say the ID chip detects the optical signature of the surrounding material (that is to say determines the light pattern produced by projecting the optical pattern) and permanently and safely stores this light pattern.

Alternatively or additionally, the chip may also store a cryptographic hash value or an MAC (Message Authentication Code) protected with a key, or a signature of the light pattern.

During operation, the chip determines the signature of the surrounding material with the aid of the light sensor arrangement 304 and corresponding illumination and checks whether the light pattern of this signature corresponds to the light pattern stored by the chip during personalization.

The result of the check is then electronically transmitted, for example, from the chip 302 (for example by means of the contacts 303) to a checking system which outputs, for example, a suitable message to the user of the checking system, for example a message which indicates if it has been detected that the chip is not in its correct chip carrier (that is to say the chip carrier with the correct signature which was paired with the chip).

Figure 4:
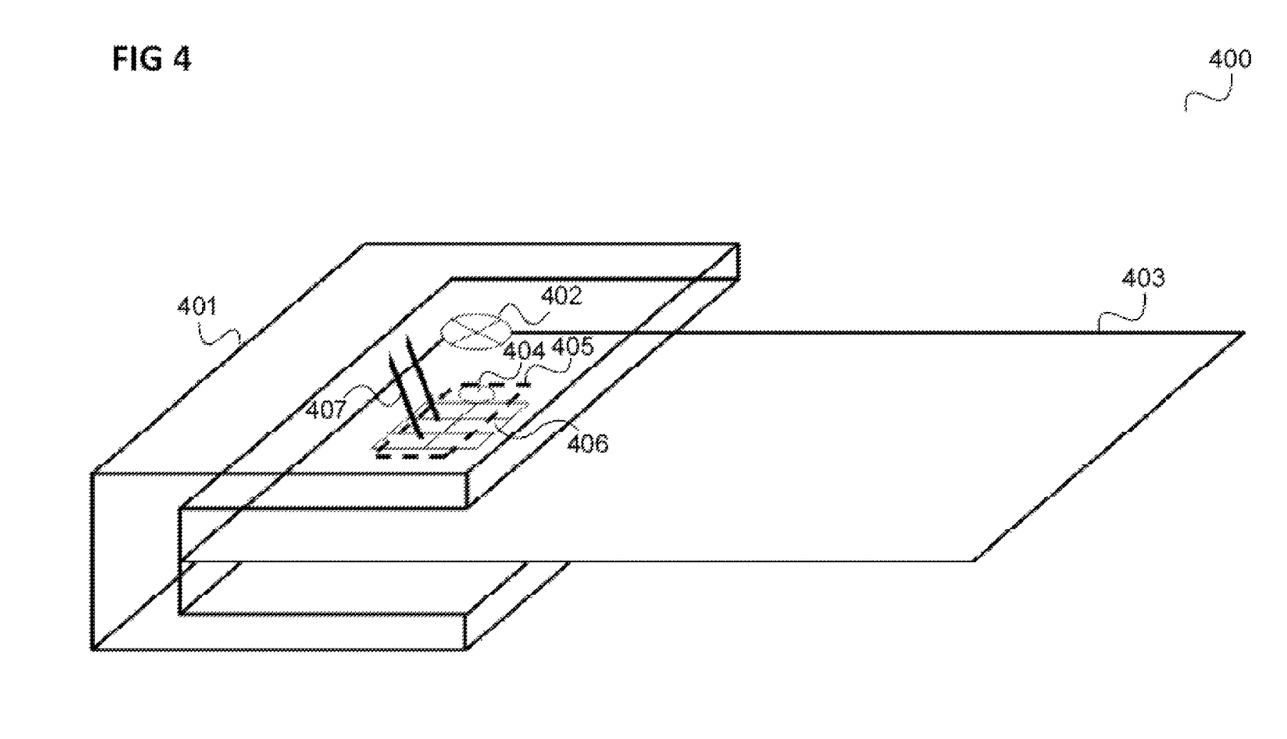
FIG. 4 shows a chip card reading arrangement with a chip card reader which operates with contacts.
Figure 5:
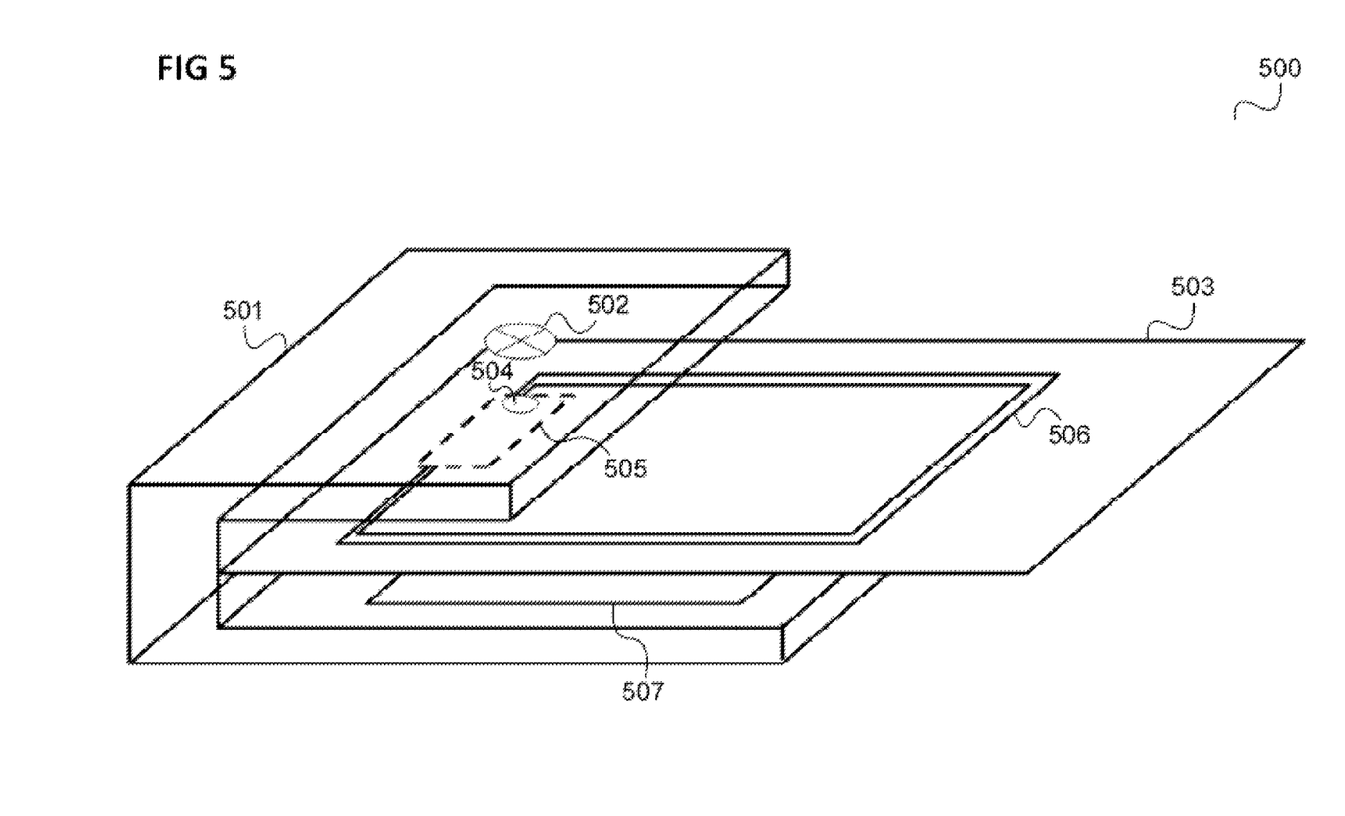
FIG. 5 shows a chip card reading arrangement with a chip card reader which operates in a contactless manner.

Examples of corresponding readers (that is to say reading apparatuses) which can be used for such a checking system are illustrated in FIG. 4 and FIG. 5.

FIG. 4 shows a chip card reading arrangement 400 having a chip card reader 401 which operates with contacts.

The chip reader 401 contains a light source 402 which corresponds to the light source 308.

A chip card having a chip card body 403 which corresponds to the chip carrier 301 is arranged in the chip card reader 401 in such a manner that the light sensors 404 of a chip 405 (corresponding to the light sensor arrangement 304 and the chip 302) are illuminated by the light source 402.

As described above, the chip 405 checks whether the optical pattern projected onto the light sensors 404 corresponds to a reference pattern, and communicates the result of the check to the chip card reader 401 by contact fields 406, which are connected to the chip 405 (for example corresponding to the contacts 303), and electrical contacts 407 of the chip card reader 401.

FIG. 5 shows a chip card reading arrangement 500 having a chip card reader 501 which operates in a contactless manner.

The chip reader 501 contains a light source 502 which corresponds to the light source 308.

A chip card having a chip card body 503 which corresponds to the chip carrier 301 is arranged in the chip card reader 501 in such a manner that the light sensors 504 of a chip 505 (corresponding to the light sensor arrangement 304 and the chip 302) are illuminated by the light source 502.

As described above, the chip 505 checks whether the optical pattern projected onto the light sensors 504 corresponds to a reference pattern, and communicates the result of the check to the chip card reader 501 by an antenna 506, which is connected to the chip 505 by the contacts 303 for example, and an antenna 507 of the chip card reader 501.

Individual optical signatures of the chip carrier 301 can be imaged onto the light sensor arrangement 304, for example, 1) using structured films or imprints which are arranged directly above the chip 405 in a separate field/area and, for example,
  1.1) random patterns which are concealed or integrated in a photograph of the person identified by the identification document,
  1.2) random patterns which are produced using invisible ink,
  1.3) random patterns which are produced with an applied ink which is transparent only in particular wavelength ranges or has different transmission properties in different frequency windows (with the result that a greater amount of information per area is achieved);
2) using the light source 308, for example by virtue of
  2.1) the light source 308 lighting up in succession at a plurality of frequencies (which can be achieved by using light-emitting diodes, for example), with the result that a plurality of different patterns are imaged by the same area (for example by virtue of different parts of the covering layer 305 being transparent at different frequencies),
  2.2) the light source transmitting a temporal flashing pattern which carries information (like, for example, in the case of an optical TAN (transaction number) generator).

In other words, in one embodiment, a chip checks whether a transparent layer covering the chip images an optical pattern onto the light sensor arrangement given predefined irradiation (with regard to the frequency and temporal sequence, for example order of frequencies), with which pattern the chip is paired, that is to say whether the layer images an optical pattern which matches a reference pattern of the chip.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip arrangement, comprising:
 a chip carrier;
 a chip which is arranged in or on the chip carrier;
 a light sensor arrangement, arranged on the chip, in the chip or beside the chip;
 a transparent layer which covers the light sensor arrangement; and wherein the transparent layer comprises an optical pattern;
 wherein the light sensor arrangement is configured to determine a light pattern of light received by the light sensor arrangement from outside the chip arrangement through the transparent layer; wherein the light pattern of light is projected onto the light sensor arrangement by an external chip reader;
 a test circuit, connected to the light sensor arrangement, and configured to check whether the light pattern matches a reference light pattern and to output a signal on the basis of the result of the check.

2. The chip arrangement of claim 1,
 wherein the chip arrangement is a chip card; and
 wherein the chip carrier is a chip card body.

3. The chip arrangement of claim 1,
 wherein the chip arrangement is an identification document;
 wherein the chip is an identification chip; and
 wherein the chip carrier is a carrier material of the identification document.

4. The chip arrangement of claim 1,
 wherein the light sensor arrangement is arranged on the chip.

5. The chip arrangement of claim 1,
wherein the chip comprises the light sensor arrangement.

6. The chip arrangement of claim 1,
wherein the chip comprises the test circuit.

7. The chip arrangement of claim 1,
wherein the transparent layer is a film.

8. The chip arrangement of claim 1,
wherein the transparent layer comprises the optical pattern comprising transparent and opaque elements.

9. The chip arrangement of claim 1,
wherein the optical pattern comprises elements which are opaque or transparent depending on a frequency or wavelength of light.

10. The chip arrangement of claim 1,
wherein the transparent layer is arranged on the light sensor arrangement, which is arranged in the chip carrier.

11. The chip arrangement of claim 1,
wherein the test circuit is configured to output the signal to a checking apparatus which is outside the chip arrangement.

12. The chip arrangement of claim 1, further comprising:
a memory configured to store information relating to the reference light pattern;
wherein the test circuit is configured to check whether the light pattern matches the reference light pattern on the basis of the information relating to the reference light pattern.

13. The chip arrangement of claim 12,
wherein the information relating to the reference light pattern is a hash value of the reference light pattern.

14. The chip arrangement of claim 1,
wherein the light sensor arrangement comprises a plurality of light sensors.

\* \* \* \* \*